United States Patent [19]

Wyffels

[11] 4,395,132
[45] Jul. 26, 1983

[54] STIRRING GEAR WITH INTERNAL HEATING

[75] Inventor: Achiel Wyffels, Roeselare, Belgium

[73] Assignee: Constructie Werkhuizen Vandekerckhove N.V., Roeselare, Belgium

[21] Appl. No.: 220,920

[22] Filed: Dec. 29, 1980

[30] Foreign Application Priority Data

Dec. 28, 1979 [BE] Belgium ............................ 880930

[51] Int. Cl.³ ............................................. B01F 15/06
[52] U.S. Cl. ..................................... 366/147; 165/92
[58] Field of Search ................. 366/147, 196; 165/92

[56] References Cited

U.S. PATENT DOCUMENTS

| 3,020,025 | 2/1963 | O'Mara | 366/147 X |
| 3,285,330 | 11/1966 | Root | 366/147 X |
| 3,762,947 | 10/1973 | Ornstein et al. | 366/147 X |
| 3,884,294 | 5/1975 | Lödige et al. | 165/92 |
| 4,133,375 | 1/1979 | Ducasse et al. | 366/147 X |
| 4,143,975 | 3/1979 | Lödige et al. | 366/147 |
| 4,233,676 | 11/1980 | Lücke et al. | 366/147 |

FOREIGN PATENT DOCUMENTS 256037  1/1963  Australia ............................ 165/92

Primary Examiner—Philip R. Coe
Assistant Examiner—Joseph M. Pitko
Attorney, Agent, or Firm—Shelsinger, Arkwright, Garvey & Dinsmore

[57] ABSTRACT

A stirring gear adapted for internal heating comprising a central tubular shaft for the supply of a heat exchange medium and stirring paddles mounted perpendicularly to the shaft and provided with hollow interspaces through which the heat exchange medium may pass, the stirring paddle comprising a solid plate having a system of small cross section ducts extending parallel to the plate surfaces and communicating with the hollow interior of the central tubular shaft.

19 Claims, 7 Drawing Figures

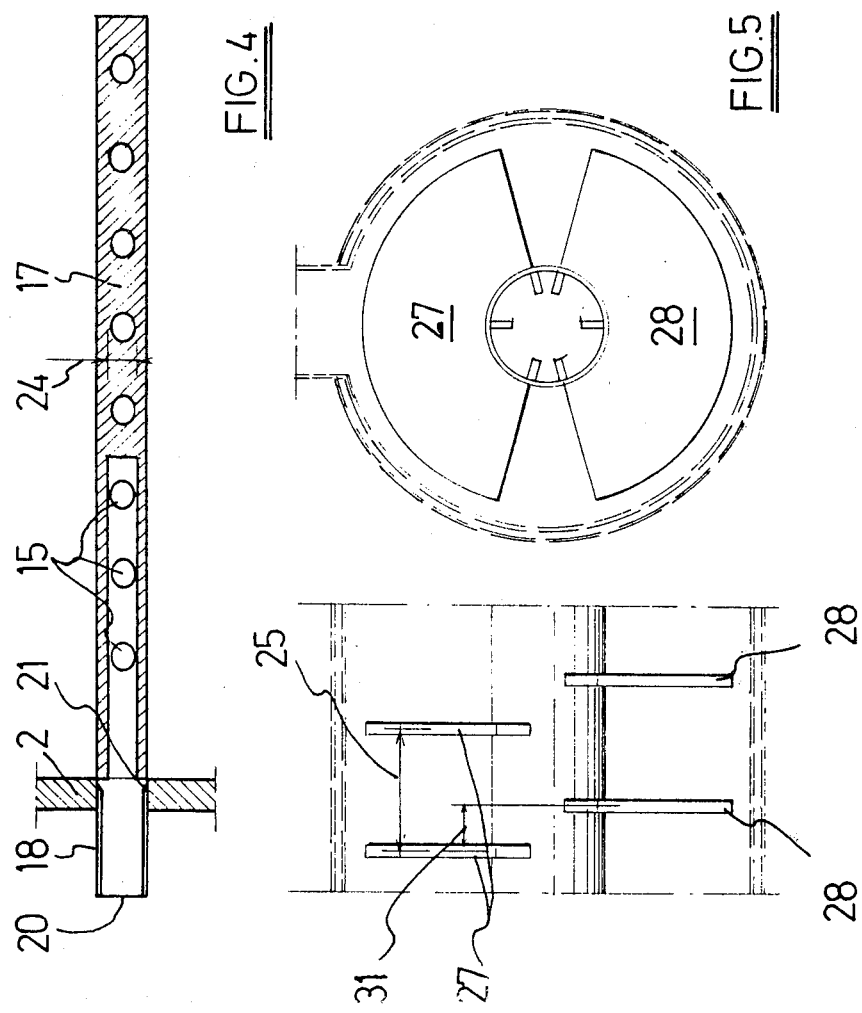

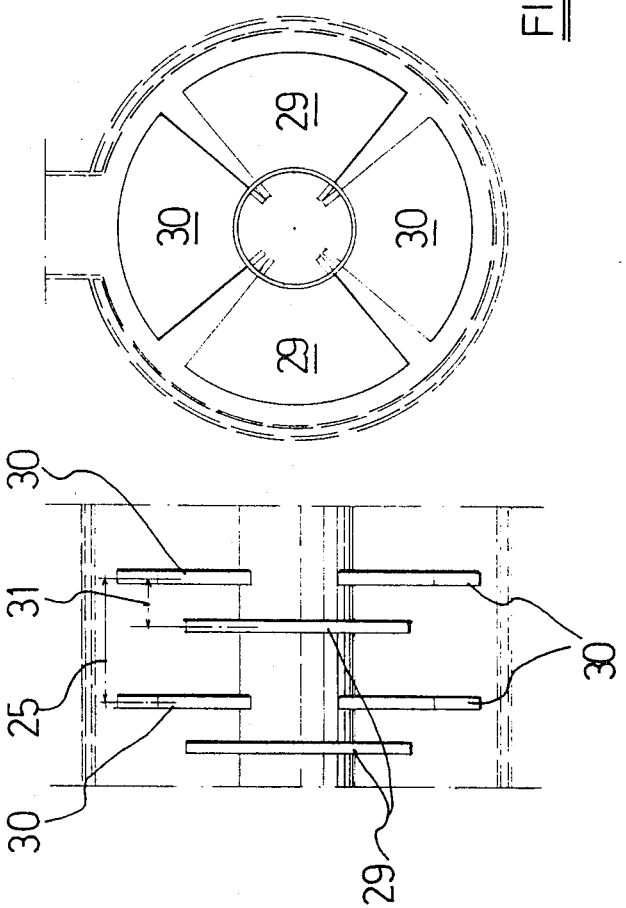

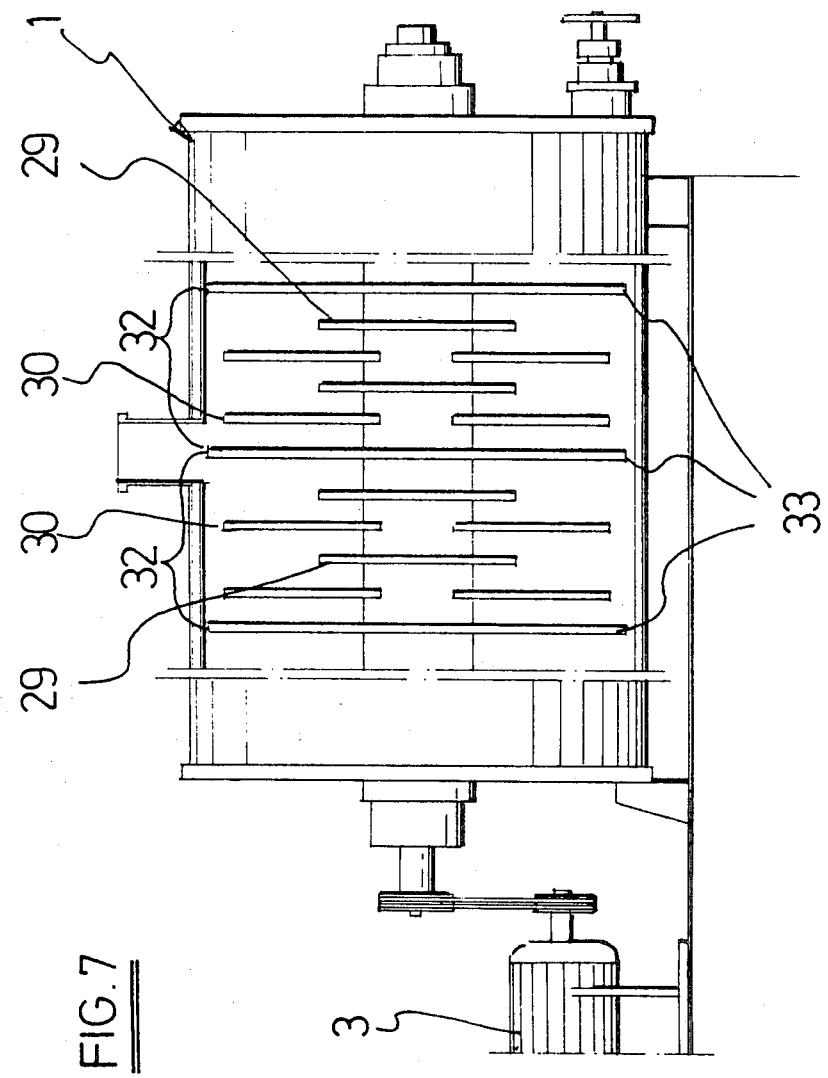

STIRRING GEAR WITH INTERNAL HEATING

The invention relates to a stirring gear with internal heating mounted for rotation about a shaft located in a cylindrical housing whereby the combination of housing and stirring gear (i.e. the stirring vessel) can be used as a heat exchanger, mixing or kneading device, drying device, sterilizer, evaporator, crystallizer, condenser, concentractor or reactor.

BACKGROUND AND OBJECTS

It is known, for example from the Belgian Pat. No. 803,292 of applicant, to use internally heated stirring gears comprising hollow stirring paddles fixed to a hollow shaft. The hollow paddle generally are hollow discs of welded platework. These hollow paddles present the disadvantages of requiring very difficult welding work during manufacture. Moreover, when the paddles are brought to temperature by overheated steam or another medium under high pressure, then it must possess a very high mechanical resistance against pressure differences. The welded plate-work must therefore be very heavy and properly finished to avoid leakage, cracking or fracturing due to explosion.

It is an object of the invention to provide stirring paddles that are easy to manufacture and which can easily be welded to the hollow tubular shaft of the stirring gear and, if necessary, to each other as well. Moreover, a stirring paddle of this kind has such a shape and sturdiness that any danger of explosion caused by pressure differences is avoided.

DESCRIPTION OF THE DRAWINGS

These and other advantages of the invention will be understood from the description of a preferred embodiment illustrated in the adjoining figures.

FIG. 4 is a cross-sectional view of the stirring paddles according to the line IV—IV in FIG. 3;

FIGS. 5 and 6 are schematic examples of the so called alternated mounting of the stirring paddles;

FIG. 7 illustrates a stirring vessel split up into successive axial stirring chambers separated from each other by stirring discs.

DESCRIPTION OF THE INVENTION

Figure 1:
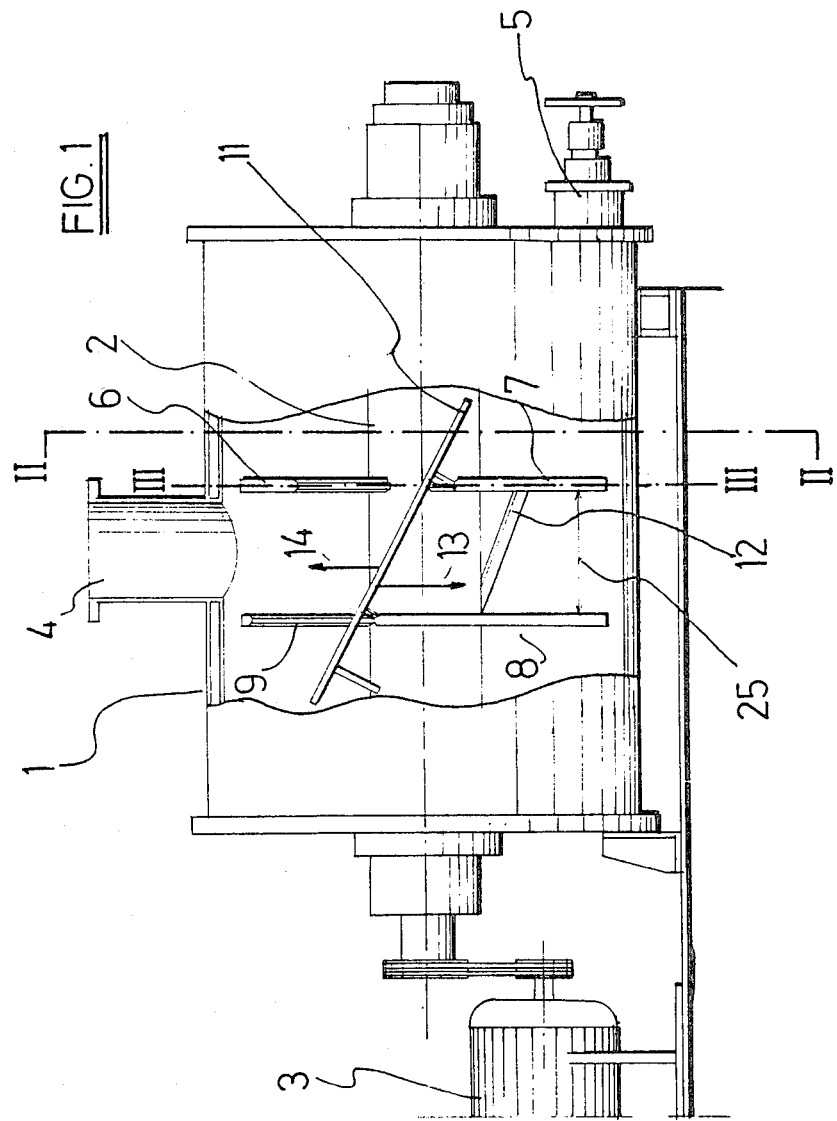
FIG. 1 is a plan view of a stirring vessel comprising a stirring gear with paddles according to the invention with parts broken away for clarity.

The stirring vessel shown in FIG. 1 comprises a cylindrical double-walled housing or jacket 1. The jacket can be internally heated by means of for example stream. In the center of this housing there is a hollow tubular shaft 2 which can be rotated by means of a motor 3 and to which an internal heating medium (e.g. steam) can be fed in a known manner. The housing is provided with an intake opening 4 for the material to be processed and at the bottom with a discharge opening which can be closed by cover 5. Any vapors formed in the housing can be exhausted through vents (not shown) connected to the wall.

Regularly spaced flat stirring paddle elements, such as 6, 7, 8 and 9, are fixed perpendicularly to the outside periphery of the tubular shaft, e.g. by welding. Via the hollow space of the tubular shaft and through suitable apertures in the wall of the tube the heating medium enters into the stirring paddles. The stirring gear is applicable e.g. as an offal sterilizer.

Figure 2:
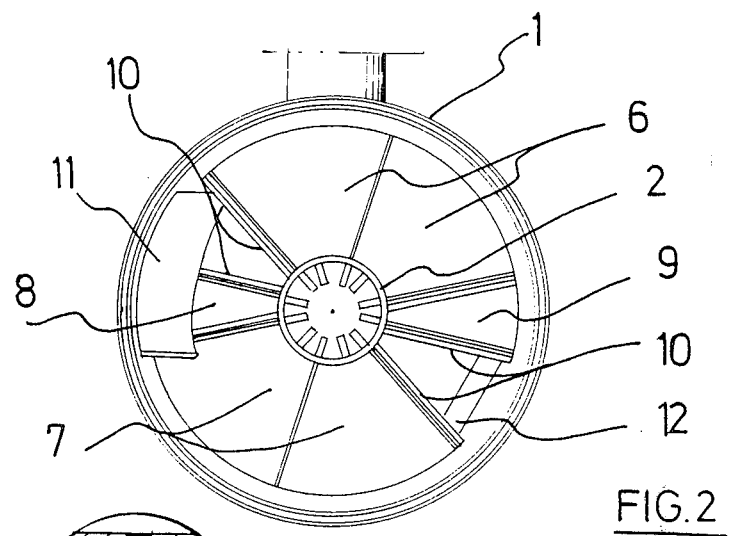
FIG. 2 is a cross-sectional view of FIG. 1 along the line II—II.

As illustrated in FIG. 2 the stirring paddles 6 and 7, resp. 8 and 9, preferably have the shape of a sector of a circle which, if desired, is composed of partial sectors such as 6a, 6b, 7a and 7b. The radial edges 10 stimulate the stirring effect on the viscous or grannular material and hence also the heat transfer from the stirring paddles and the jacket 1 towards the material. However, it is also possible to dispose these stirring paddle partial sectors 6a, 6b, 7a and 7b, etc. in such a manner against each other that they form a complete stirring disc without sector-shaped intermediate spaces.

The axially successive stirring paddles 7 and 8 resp. 7 and 9 are preferably also connected to each other, so as by welding, by means of connecting plates 11, resp. 12. These plates which are disposed obliquely to the tubular shaft also stimulate the stirring effect and the contact exchange (i.e. heat transfer) with the stirring paddles, resp. the jacket 1. The direction of rotation indicated by arrow 13 is used during the stirring process, while a rotation in the opposite direction according to arrow 14 serves to move the processed material towards the discharge opening 5.

Figure 3:
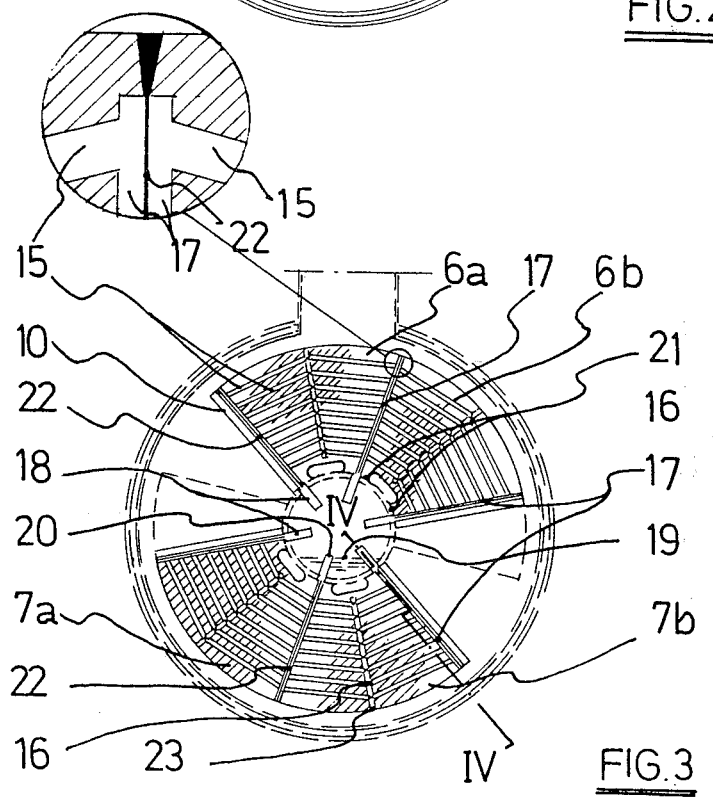
FIG. 3 is a cross-sectional view of the stirring paddles according to the line III—III in FIG. 1.

The stirring paddles according to the invention comprise a solid plate in which a system of ducts 15, 16 and 17 running parallel to the paddle surfaces and with limited cross-sections are provided as shown in FIG. 3. This system commmunicates with the interior of the central tubular shaft 2. The system of ducts preferably comprises a number of radial ducts 16 and 17 which communicate with each other by transverse ducts 15. At least some of the radial ducts, more particularly the ducts 17, communicate with the inner space of the shaft 2, preferably via radial tubular segments 18 extending inside the hollow shaft. When, for heating the shaft and stirring paddles e.g. steam is used, then it will circulate in the duct system via bores 21 (FIG. 4) in the tubular wall and located opposite the mouths of the ducts 17. Any formed condensation water will flow back into the tube via the same ducts. It may thus happen that the bottom section of the tube gets filled with condensate up to a certain level 19. In order to prevent condensate from drawing back into the ducts 17 the inward mouths 20 of the tubular segments 18 must be above the maximum level 19 in any position of the rotation.

As further shown by FIG. 3 the stirring paddle sectors 6 and 7 preferably consist of a number of partial sectors 6a and 6b, resp. 7a and 7b which in the common boundary zone form a joint duct 17. The radial edge slats 10 form another common duct 17 with the mentioned partial sectors. The basic element of the stirring paddles thus is the partial sector which near its radial edges forms duct sections 17 from which transverse ducts 15 run to e.g. a common radial duct 16. Near the tubular shaft these partial sectors are provided with adapted supporting feet 21 which are so made that they can be easily welded to the tubular shaft. The partial sectors are connected both to each other and to the edge slat 10 by radial and easily applicable welding seams 22 in the mutual contact zones around the ducts 17. Since, in practice, the ducts are drilled in the plates, the outward drilling holes 23 will have been made tight by welding.

The cross-section of the stirring paddle, partially according to the longitudinal direction of a radial duct as shown in FIG. 4 illustrates the suitable ratios for the cross-dimensions of the ducts and stirring paddles at which an optimal heat transfer at an optimal mechanical strength is achieved. The largest cross-dimensions 24 of the ducts perpendicular to the surfaces of the stirring paddle will preferably be at most 80% and at least one third of the stirring paddle thickness. This guarantees a uniform heat transfer towards, and hence a uniform temperature on the stirring plate surface. The distance between each pair of neighboring transverse ducts 15 will at most be equal to twice the stirring paddle thickness. Owing to these measures the stirring paddle keeps a high mechanical strength which can sustain both the external forces exerted on the stirring paddles by the material to be treated and the internal forces, e.g. in case of internal heating (or cooling), by fluid under very high pressures, so that explosion of the stirring paddles is prevented. The stirring paddles are usually made of metal, on the one hand for obtaining the desired strength, and, on the other hand, for reaching the required heat conductivity. The thickness of the stirring paddles may be choosen between about 20 mm and 50 mm. Their solid state also benefits the durability of the paddles since the material thickness at both sides of the ducts represents a substantial reserve against wear caused by friction by the material to be processed against the stirring paddle surfaces. This is an important additional advantage of the invention.

The axial spacing (according to the direction of the tubular shaft) between successive sectoral stirring paddles and their relative angular orientations will be selected with a view to the nature of the material to the processed. When the successive stirring paddles have substantially the same direction, so as for example the paddles 6 and 9, resp. 7 and 8 in FIG. 1 or 27 and 28 in FIG. 5, resp. 29 and 30 in FIG. 6, then this distance 25 will be at least twice the stirring paddle thickness. However, in certain cases it can be useful to provide the axially successive stirring paddle sectors 27, 28 according to FIG. 5, or 29, 30 according to FIG. 6 with a mutually considerably different angular orientation.

In this case the distance 31 between two successive sectors with unequal orientations will be between one fourth of and half the distance 25. In general, solid stirring paddles are essentially thinner than the hollow discs of welded platework according to the state of the art. This offers the additional advantage that with the same number of plates a greater volume of material can be processed in the stirring vessel. If the number of plates per unit of volume of the stirring vessel is increased, then a more intense heat exchanger and, if so desired, mixing or stirring can be achieved for the same volume of material to be processed than in the known stirring vessels so that the duration of the process can be shortened. When the stirring paddles are heated by superheated steam then their solid state allows applying higher steam pressures (i.e. higher steam temperatures). This further benefits the effectiveness of the stirring vessel.

It is also possible to mount stirring paddle combinations on the tubular shaft as shown in FIG. 7 so that the housing of this stirring vessel is split up into axially successive stirring chambers 32 which are separated from each other by full discs 33 as stirring paddles and whereby between each pair of discs 33 a number of sectoral stirring paddles are mounted. The treatment conditions (stirring, temperature, etc.) of the material to be processed may then differ from one stirring chamber to another. By the application of connecting plates 11, 12 on the sector plates in these stirring chambers it is possible to change, e.g. to raise, progressively the compressing and kneading action per chamber from one chamber-bounding disc 33 to another.

The invention is not limited to the embodiment described above. The duct system in the stirring paddles may be different. It is also possible to provide electric heating elements in the ducts (e.g. a spiral resistor wire) to bringe or keep a circulating fluid to temperature inside the ducts. The shapes and positions of the connecting plates 11, 12 can be adapted to the circumstances. If desired, they can be completed or substituted by substantially radial partitions or knives fixed to the inner wall of the cylindrical housing of the stirring vessel and possibly rub a scraping knives against the rotating stirring paddle surfaces to counteract sticking or encrusting of the material to be processed. If necessary, they can be heated up by bringing them in contact with the interior of the housing jacket.

When a continuously working cooking vessel or other heat exchanger is envisaged with heated stirring gears according to the invention and wherein the material to be cooked or e.g. dried is continuously delivered next to one of the axial end portions of the stirring vessel and discharged at the other end, then temperature can be increased from inlet towards outlet in the vessel. For that purpose the central hollow shaft can be divided e.g. into two separate longitudinal sections. In the first section from the inlet side to the middle of the vessel, heating means with a lower temperature are applied than in the second section crossing the rest of the stirring vessel towards the outlet side.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. Stirring gear with internal heating comprising a central tubular shaft for the supply of the heat exchange medium and stirring paddles mounted perpendicular to said shaft and provided with hollow inner spaces for the access of the heat exchange medium, wherein a stirring paddle comprises a solid plate with a hollow inner space therein and said space further comprising a system of interconnecting ducts, wherein a number of said ducts extend substantially radially of said shaft and a number of said ducts extend substantially transversely of said shaft, wherein said transversely extending ducts define at least one radial array of ducts, wherein adjacent said radial ducts are interconnected by said radial array.

2. Stirring gear according to claim 1, wherein said stirring paddles are sector-shaped.

3. Stirring gear according to claim 2, wherein intermediate spaces are provided between successive sectoral plates.

4. Stirring gear according to claim 2, characterized in that a member of successive partial sectors contact each other to form a complete stirring disc.

5. Stirring gear according to claim 2, characterized in that a number of ducts, more specifically the duct (17), near the central tubular shaft, communicate with radial tubular segments (18) extending inside the hollow shaft.

6. Stirring gear according to claim 5, wherein said radial ducts extend sufficiently far into said tubular shaft as to always be extended beyond any condensation contained in said central tubular shaft.

7. Stirring gear according to claim 1, 2, 3, 4, or 5 characterized in that the largest cross-dimension (24) of the ducts perpendicular to the surfaces of the stirring paddle is at most 80% of the stirring paddle thickness, wherein said paddle thickness is measured between the co-planar radial sectors of a paddle.

8. Stirring gear according to claim 1, 2, 3, 4 or 5 characterized in that the spacing between each pair of adjacent transverse ducts is at most equal to twice the stirring paddle thickness.

9. Stirring gear according to claim 2 characterized in that the axial (tubular shaft direction) distance between successive sectors with the same orientation is at least equal to twice the stirring paddle thickness.

10. Stirring gear according to claim 2 characterized in that the axial (tubular shaft direction) distance between two successive sectors with unequal orientation is between one-fourth and one-half of the distance between successive sectors with the same orientation.

11. Stirring gear according to claim 10 characterized in that a number of the stirring paddles are connected to each other by means of oblique connection plates (11, 12).

12. Stirring gear according to claim 2 characterized in that alternating stirring discs (33) and a number of sectoral stirring paddles are mounted on the tubular shaft.

13. Stirring vessel according to claim 2, wherein a radial duct is provided at least along each radial edge of said sector-shaped paddle.

14. Stirring gear according to claim 2, wherein said transversely oritented ducts are of shortest length nearest to said central tubular shaft and become progressively longer as their distance from said central tubular shaft is increased.

15. Stirring gear according to claim 2, wherein said transversely oriented ducts are concentric about said central tubular shaft longitudinal center.

16. Stirring gear according to claim 2, wherein radial ducts extend parallel to said plate surface along the outer edge of said stirring paddle.

17. Stirring gear according to claim 2, wherein said transverse ducts communicate with each other through an additional radial duct, said additional radial duct located approximately along the mid-line of said first transverse ducts, and hence through said radial ducts.

18. Stirring gear for continuously operating stirring vessel according to claim 1 characterized in that the central tubular shaft comprises at least two separate longitudinal sections, each of said longitudinal sections capable of being supplied with heating means at a different temperature.

19. Stirring vessel according to claim 18 characterized in that it is divided by means of stirring discs (33) into successive axial stirring chambers (32).

* * * * *